United States Patent [19]

Puri

[11] Patent Number: 4,837,386
[45] Date of Patent: Jun. 6, 1989

[54] METHOD OF TREATING MEMBRANES WITH ULTRAVIOLET RADIATION

[75] Inventor: Pushpinder S. Puri, Macungie, Pa.

[73] Assignee: Air Products and Chemicals, Inc., Allentown, Pa.

[21] Appl. No.: 65,795

[22] Filed: Jun. 24, 1987

[51] Int. Cl.$^4$ ............................................. C08F 30/08
[52] U.S. Cl. .......................... 204/157.61; 204/157.74; 522/148; 526/279
[58] Field of Search ........... 204/157.15, 157.6, 157.61, 204/157.74; 522/148; 526/279

[56] References Cited

U.S. PATENT DOCUMENTS 4,607,088  8/1986  Nomura et al. .................... 526/279

FOREIGN PATENT DOCUMENTS 85-3030880  1/1985  European Pat. Off. .
59-62354   10/1985  Japan .
60-257807  12/1985  Japan .

*Primary Examiner*—John F. Niebling
*Assistant Examiner*—Kathryn Gorgos
*Attorney, Agent, or Firm*—Mark L. Rodgers; William F. Marsh; James C. Simmons

[57] ABSTRACT

The present invention is a process for enhancing the permselectivity of a polymeric membrane containing substituted acetylene monomer units without adversely affecting the mechanical properties of the membrane. The process comprises irradiating the surface of the membrane with ultraviolet light while maintaining it in an environment comprising a fluid which is capable of removing surface heat from the polymer film surface without significantly absorbing or depleting the intensity of the ultraviolet rays in the range of 230–280 nm.

14 Claims, No Drawings

METHOD OF TREATING MEMBRANES WITH ULTRAVIOLET RADIATION

TECHNICAL FIELD OF THE INVENTION

The present invention relates to the treatment of substituted acetylenic polymeric membranes to enhance the permselective properties.

BACKGROUND OF THE INVENTION

Various techniques have been employed to increase the permeability and selectivity of polymeric membranes with regards to gaseous and/or liquid mixtures. U.S. Pat. No. 4,607,088 and its European equivalent 85303088.0 disclose a shaped body having high performance for gas separation, especially for the enrichment of oxygen in air. The shaped body comprises a polymer of a silyl acetylene compound whose surface has been exposed to an atmosphere of low temperature plasma of an inorganic gas. The low temperature plasma is generated by an electrical discharge under conditions which include a frequency in the range from 10 kHz to 100 MHz and a power input of 10 watts to 100 kilowatts.

Japanese patent application Sho 59-62354 discloses a gas separation membrane with high selectivity, composed of an ultraviolet-irradiated body made of a 1-monoalkyldimethylsilylpropyne polymer. The intensity of the irradiation can be any strength 1 mW/cm$^2$ or higher, with irradiation time varying with irradiation strength. Ultraviolet rays with wavelengths of 40-400 nm are used.

Japanese patent application 60-257807 discloses a gas separation mold comprising a silyl acetylene polymer irradiated by ultraviolet rays of wavelengths between 105 and 200 nm. The irradiation time depends upon the strength and quality of the light source, and the environment of the treatment is specifically stated not to be critical, with one example being air.

BRIEF SUMMARY OF THE INVENTION

The present invention is a process for enhancing the permselectivity of a polymeric membrane containing substituted acetylene monomer units without adversely affecting the mechanical properties of the membrane. The process comprises irradiating the surface of the membrane while maintaining it in an environment comprising a fluid which is capable of removing surface heat from the polymer without significantly absorbing or depleting the intensity of the ultraviolet rays having wavelengths between 230–280 nm, and preferably those having wavelengths less than 300 nm. The fluid environment should be capable of maintaining the surface temperature of the polymer at 160° F. or lower during treatment, and preferably less than or equal to about 125° F.

The fluid environment absorbs heat associated with the ultraviolet treatment, thereby keeping the membrane cool and eliminating localized heating of the membrane, which under conventional treatment, causes defects in the surface layer of the membrane. Employing an appropriate fluid environment for the membrane during treatment, allows for longer ultraviolet exposure times resulting in membranes of superior permselective properties. The present process enhances the permselectivity of both dense film and asymmetric polymeric membranes which contain substituted acetylene monomer units.

DETAILED DESCRIPTION OF THE INVENTION

The present invention is a process for enhancing the permselectivity of a polymeric membrane containing substituted acetylene monomer units. The surface of the membrane is irradiated with ultraviolet rays while the membrane is maintained in an environment comprising a fluid which is capable of removing surface heat without significantly absorbing or depleting the intensity of the ultraviolet rays having wavelengths between 230–280 nm, and preferably those having wavelengths less than 300 nm.

It is believed that UV irradiations having wavelengths of <300 nm are absorbed by the polymeric membrane and cause crosslinking of the polymer on the membrane surface. This crosslinking results in a highly permselective composite membrane consisting of a selective surface on a highly permeable base. When such membranes are irradiated without employing an environment capable of removing sufficient heat from the membrane surface, low intensity and/or short UV exposure times must be used to avoid the formation of cracks and other defects on the membrane surface caused by localized heating of the membrane skin. It has now been found that if the membrane is maintained in an environment capable of removing sufficient surface heat from the membrane without depleting the UV rays having wavelengths between 230–280 nm, they can be exposed to higher UV intensities for longer exposure times without incurring surface defects, thus resulting in membranes having superior permselective properties.

UV treatment without the use of a heat removal fluid environment results in a surface temperature of about 170° F. It has been shown that by decreasing the surface temperature by as little as 10°-20° F., i.e., to about 160°-150° F. or below, improved permselective results are observed. This decrease in temperature can be achieved by using a variety of fluid environments, such as by passing a nitrogen sweep gas at a predetermined velocity, over the surface of the membrane during treatment.

While the use of a sweep gas to cool the membrane surface is effective to yield some improvement in membrane performance, it is preferred that the fluid environment be capable of maintaining the membrane surface at a temperature of about 125° F. or less. Such temperatures are best achieved by using a suitable liquid environment, such as water, during the treatment. While, because of availability and cost, water is the preferred environment, any fluid which is capable of maintaining the desired membrane surface temperature without adversely reacting with the membrane or absorbing UV rays having wavelengths between 230–280 nm can be used. While it has been shown that exposure to UV wavelengths between 230–280 nm are critical to enhance membrane performance, it is preferred that the fluid environment allow all UV rays having wavelengths less than 300 nm reach the membrane surface. The preferred fluid environments are those which provide both a direct heat exchange with the membrane surface and also absorb IR radiations associated with the UV treatment, thereby further enhancing cooling.

The membranes which exhibit enhanced permselective properties when treated in accordance with the present invention are polymeric membranes comprising substituted silylacetylene monomer units. Preferably the polymeric membrane has the general structural formula:

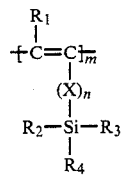

wherein $R_1$ is H or a $C_1$-$C_2$ alkyl group; $R_2$ and $R_3$ are independently linear or branched $C_1$-$C_6$ alkyl groups; $R_4$ is a linear or branched $C_1$-$C_{12}$ alkyl or aryl groups; X is a $C_1$-$C_3$ alkyl group or phenyl; m is at least 100; and n is 0 or 1.

Polymeric membranes comprising trialkylgermylacetylene derived monomer units are also suited for this invention. Membranes comprising substituted acetylene monomer units as described above, with one or more other copolymerizable monomers can also be used.

When a liquid environment is used, the depth of the liquid in which the membrane is submersed is not critical, although it is preferred that a depth of about 10 cm not be exceeded. Additionally, best results are achieved when the membrane is actually submersed in the liquid rather than just saturated and treated in a dry environment. Liquid environments comprising a mixture of two or more suitable components may also be used.

The present invention allows UV exposure times to be increased without causing defects on the membrane surface. The specific exposure times will vary with the specific membrane and environment used, and also with the intensity of the treatment, with typical treatment times ranging between 1 and 15 seconds, and typical intensities ranging between 70 and 200 mW/cm$^2$.

EXPERIMENTAL

A UVEXS® ultraviolet irradiation system was obtained from Dow-Corning Corporation, in which a UV lamp is mounted over a conveyor belt. The equipment was designed to handle membranes ranging up to 16 inches in width, and exposure time was easily and accurately varied over a wide range by adjusting the belt speed. The membranes to be irradiated were mounted either on a glass plate or in a petri dish. The UV lamp was turned on and allowed to equilibrate for at least four minutes. The membranes were exposed to UV irradiation for a predetermined time. Several of the membranes were UV irradiated in petri dishes, while immersed in a predetermined amount of water. After the samples had undergone UV irradiation, they were air dried and mounted in permeability cells, and pure gas ($O_2$ and $N_2$) permeance was measured at 25° C. at a feed gas pressure of 50 psig.

Several samples of asymmetric membranes of poly(trimethylsilylpropyne) (PTMSP) were UV irradiated and, their permselective properties were measured. The samples were fabricated using a wide variety of formulations and casting conditions. The examples below were carried out in accordance with the above procedure and are presented to illustrate the present invention and are not meant to be limiting.

EXAMPLE 1

PTMSP membranes obtained from several different castings with $O_2/N_2$ permselectivities between 1.2 and 1.4 were exposed to two levels of UV irradiation intensities, 137 and 183 mW/cm$^2$, respectively. The specific treatment conditions along with the $O_2$ permeance (P/l) and $O_2/N_2$ selectivity ($\alpha$) are reported in Table 1 below.

TABLE 1

| Membrane Casting No. | P/l $O_2 \times 10^{-5}$ | $\alpha^{O_2}_{N_2}$ |
|---|---|---|
| Bases: P/l in Barrers/cm UV Irradiation Conditions: Water depth = 0.5 cm Exposure time = 5.0 sec. | | |
| Intensity = 183 mW/cm$^2$ | | |
| 1 | 10.8 | 4.5 |
| 2 | 11.4 | 4.4 |
| 3 | 10.5 | 4.2 |
| 4 | 10.2 | 4.3 |
| 5 | 15.5 | 4.1 |
|   | 14.6 | 4.2 |
|   | 16.6 | 4.0 |
|   | 17.9 | 4.0 |
| 6 | 20.7 | 4.7 |
|   | 25.7 | 4.6 |
| 7 | 14.1 | 4.0 |
|   | 14.6 | 3.9 |
|   | 14.6 | 3.9 |
| Intensity = 137 mW/cm$^2$ | | |
| 8 | 19.8 | 2.1 |
| 1 | 30.9 | 1.9 |

The above-reported results show that permselectivities of $\geq 3.9$ were obtained for different samples of PTMSP membranes when exposed to high intensity irradiations; i.e., 183 mW/cm$^2$. Low intensity irradiations; i.e., 137 mW/cm$^2$ resulted in marginal permselectivity improvements.

EXAMPLE 2

Several runs were made using membrane samples from membrane casting Nos. 6 and 7 (see Example 1), to determine the effect of the depth of the water layer over the membrane during UV treatment. The specific conditions of the runs, as well as the permeance and selectivity data are reported in Table 2 below.

TABLE 2

| Water Depth | P/l $O_2 \times 10^{-5}$ | $\alpha^{O_2}_{N_2}$ |
|---|---|---|
| Bases: P/l in Barrers/cm UV Irradiation Conditions: Intensity = 183 mW/cm$^2$ Exposure time = 5.0 sec | | |
| MEMBRANE CASTING NO. 7 | | |
| Dry | 14.5 | 3.3 |
|  | 16.0 | 3.3 |
| Water Soaked | 16.6 | 2.6 |
|  | 11.8 | 2.3 |
| 0.5 cm | 14.6 | 3.9 |
|  | 14.6 | 3.9 |
| 2.0 cm | 18.2 | 3.3 |
|  | 14.7 | 3.8 |
| 5.0 cm | 13.5 | 3.6 |
|  | 12.9 | 3.8 |
| MEMBRANE CASTING NO. 6 | | |
| Dry | 12.3 | 4.0 |
| 0.5 cm | 25.7 | 4.6 |
|  | 20.7 | 4.7 |

The data reported in Table 2 above, show that there was an improvement in permselectivity for the membranes which were irradiated under water. The depth of the water layer, however, did not appear to be significant. Additionally, the permselectivities for the membranes which were only soaked in water (i.e., not immersed) and irradiated were surprisingly low.

EXAMPLE 3

Runs were made using membrane samples from Membrane Casting No. 7, to determine the effect of water temperature on the membrane permselectivity for a fixed water depth (0.5 cm). The specific treatment conditions and results are reported in Table 3 below.

TABLE 3

Bases: P/l in Barrers/cm
UV Irradiation Conditions:
Intensity = 183 mW/cm$^2$
Exposure time = 5.0 sec
Water depth = 0.5 cm

| Water Temperature (°C.) | P/l O$_2$ × 10$^{-5}$ | $\alpha_{N_2}^{O_2}$ |
|---|---|---|
| 1.4 | 18.5 | 3.2 |
| 1.8 | 20.8 | 3.1 |
| 20 | 14.6 | 3.9 |
|  | 14.6 | 3.9 |
| 50 | 17.9 | 3.5 |
|  | 17.5 | 3.5 |

The results reported above indicate that lower permselectivities are seen at both lower and higher temperatures, with the optimum, under the conditions employed above, being closer to room temperature.

EXAMPLE 4

The effect of light filters during UV treatment was studied to determine which wavelengths are critical for improved permselectivity. A 50% CaCl$_2$ solution filter blocks all UV radiations of wavelengths <230 nm. A pyrex glass filter blocks all radiations which are of wavelengths <280 nm. Runs were carried out using similar samples (Membrane Casting No. 7) of PTMSP membranes, and the treatment conditions along with the results, are set out in Table 4 below.

TABLE 4

Bases: P/l in Barrers/cm
UV Irradiation Conditions:
Intensity = 183 mW/cm$^2$
Exposure time = 5.0 sec
Water depth = 0.5 cm
Temperature = room

| Filter (°C.) | P/l O$_2$ × 10$^{-5}$ | $\alpha_{N_2}^{O_2}$ |
|---|---|---|
| Water only | 14.6 | 3.9 |
|  | 14.6 | 3.9 |
| 50% CaCl$_2$ Solution | 19.5 | 3.5 |
|  | 19.7 | 3.3 |
| Pyrex (3 mm) | 164 | 1.3 |
|  | 166 | 1.3 |
| Untreated | 170 | 1.3 |
|  | 172 | 1.3 |
|  | 165 | 1.3 |

The data reported above show that no permselectivity improvement was observed when a pyrex glass filter was used, i.e., wavelengths of <280 were blocked; however, an improvement comparable to the water only was observed with the CaCl$_2$ filter. These data demonstrate that the permselectivity of the PTMSP membranes is enhanced primarily by UV radiation in the wavelength range of 230-280 nm. This observation was subsequently independently confirmed by analyzing a PTMSP film using a Beckman model 5270 UV/VIS spectrometer.

The results reported in Examples 1-4 indicate that while UV treatment combined with a treatment environment capable of cooling the membrane surface results in improved membrane performance, there is a wide variety of other variables which can be adjusted in combination with the membrane environment to achieve optimum membrane performance.

EXAMPLE 5

Several runs were carried out using a nitrogen sweep gas to cool the surface of the PTMSP membranes during UV treatment. The Casting Conditions for the membranes used in this test were different from those reported in Examples 1-4. During the UV treatment N$_2$ gas was passed over the surface of the membrane through a sparger at a cylinder delivery pressure of 45 psig. The conditions and results of these runs are reported in Table 5 below.

The UV irradiation source for this Example was a UVPS ® lamp obtained from UV Process Supply company, Chicago, Ill.

TABLE 5

Bases: P/l in Barrers/cm
UV Irradiation Conditions:
Intensity = 200 mW/cm$^2$
Exposure time = 5.0 sec
Temperature = room

| Condition | P/l O$_2$ × 10$^{-5}$ | $\alpha_{N_2}^{O_2}$ | Membrane Surface Temperature (°F.) (During Treatment) |
|---|---|---|---|
| No Cooling | 15.7 | 3.4 | ≈170 |
| N$_2$ Cooling | 21.3 | 3.4 | ≈160 |
| N$_2$ Cooling | 20.0 | 3.6 | ≈150 |
| Untreated | 21.6 | 1.1 | — |
|  | 20.3 | 1.1 | — |

From the above results it can be see that cooling with N$_2$ does enhance the permeance and/or permselectivity of the PTMSP membranes. The observed improvements were small however, compared to those achieved using water as a coolant wherein the membrane surface temperature was at about 125° F.

Having thus described the present invention, what is now deemed appropriate for Letters Patent is set out in the following appended claims.

What is claimed is:

1. A process for enhancing the permselectivity without adversely affecting the mechanical properties of a polymeric membrane containing substituted acetylene monomer units, said process comprising: irradiating the surface of said membrane with ultraviolet rays having wavelengths between 230-280 nm while maintaining said membrane in an environment comprising a fluid which is capable of removing surface heat from the polymer without significantly absorbing or depleting the intensity of the ultraviolet rays having wavelengths between 230-280 nm while maintaining the surface temperature of said membrane at or below about 160° F.

2. A process in accordance with claim 1 wherein said fluid is water.

3. A process in accordance with claim 1 wherein said membrane is irradiated with ultraviolet rays for a time between 1 and 15 seconds.

4. A process in accordance with claim 1 wherein said polymeric membrane has the general structural formula:

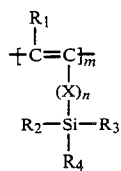

wherein $R_1$ is H or a $C_1$-$C_2$ alkyl group; $R_2$ and $R_3$ are independently linear or branched $C_1$-$C_6$ alkyl groups; $R_4$ is a linear or branched $C_1$-$C_{12}$ alkyl or aryl group; X is a $C_1$-$C_3$ alkyl group or phenyl; m is at least 100; and n is 0 or 1.

5. A process is accordance with claim 4 wherein $R_1$, $R_2$, $R_3$ and $R_4$ are methyl grups and n=o.

6. A process in accordance with claim 1 wherein said polymeric membrane comprises a copolymer containing substituted acetylene monomer units and one or more other copolymerizable monomers.

7. A process in accordance with claim 1 wherein said polymeric membrane comprises trialkylgermylacetylene derived monomer units.

8. A process in accordance with claim 1 wherein said fluid is a liquid having a depth between 0.5 and 10 cm.

9. A process in accordance with claim 1 wherein the intensity of the ultraviolet rays is between 70 and 200 mW/cm$^2$.

10. A process for enhancing the permselectivity of a membrane comprising a trialkylsilylacetylene derived polymer cast into membrane form, said process comprising: irradiating the surface of said membrane with ultraviolet rays having wavelengths between 230–280 nm while said membrane is submersed in a liquid which is capable of removing surface heat from the polymer without significantly absorbing or depleting the intensity of the ultraviolet rays in the range of 230–280 nm while maintaining the surface temperature of said membrane at or below about 160° F.

11. A process in accordance with claim 10 wherein said trialkylsilylacetylene derived polymer is polytrimethylsilyl propyne.

12. A process in accordance with claim 10 wherein said membrane is submersed in water.

13. A process in accordance with claim 12 wherein said membrane is submersed in water to a depth between 0.5 and 10 cm.

14. A process in accordance with claim 10 wherein the surface temperature of said membrane is maintained at or below 125° F.

* * * * *